(12) United States Patent
Riou et al.

(10) Patent No.: US 8,876,467 B2
(45) Date of Patent: Nov. 4, 2014

(54) INNER WALL FOR A TURBOMACHINE NACELLE

(75) Inventors: Georges Jean Xavier Riou, Melun (FR); Philippe Verseux, Draveil (FR)

(73) Assignee: SNECMA, Paris (FR)

( * ) Notice: Subject to any disclaimer, the term of this patent is extended or adjusted under 35 U.S.C. 154(b) by 718 days.

(21) Appl. No.: 13/058,408

(22) PCT Filed: Jul. 15, 2009

(86) PCT No.: PCT/FR2009/000867
§ 371 (c)(1),
(2), (4) Date: Feb. 10, 2011

(87) PCT Pub. No.: WO2010/018314
PCT Pub. Date: Feb. 18, 2010

(65) Prior Publication Data
US 2011/0142615 A1  Jun. 16, 2011

(30) Foreign Application Priority Data

Aug. 13, 2008 (FR) .................................... 08 04585

(51) Int. Cl.
| | |
|---|---|
| F01D 25/28 | (2006.01) |
| F02K 3/06 | (2006.01) |
| F01D 11/12 | (2006.01) |
| B64D 33/02 | (2006.01) |
| F02C 7/045 | (2006.01) |
| F01D 25/24 | (2006.01) |

(52) U.S. Cl.
CPC . *B64D 33/02* (2013.01); *F02K 3/06* (2013.01); *F05B 2260/301* (2013.01); *F05D 2250/283* (2013.01); *F01D 11/122* (2013.01); *B64D 2033/0206* (2013.01); *F02C 7/045* (2013.01); *F01D 25/243* (2013.01); *F05D 2260/96* (2013.01); *Y02T 50/672* (2013.01); *F05D 2240/14* (2013.01); *B64D 2033/0286* (2013.01)
USPC ......................................... 415/119; 415/214.1

(58) Field of Classification Search
USPC ................. 415/119, 9, 214.1, 173.4
See application file for complete search history.

(56) References Cited

U.S. PATENT DOCUMENTS

| | | | | |
|---|---|---|---|---|
| 5,581,054 A | * | 12/1996 | Anderson et al. ............. | 181/213 |
| 5,941,061 A | | 8/1999 | Sherry et al. | |
| 6,364,603 B1 | | 4/2002 | Czachor et al. | |
| 2005/0271503 A1 | | 12/2005 | Harper et al. | |
| 2009/0155044 A1 | * | 6/2009 | Xie et al. ......................... | 415/9 |

FOREIGN PATENT DOCUMENTS

| | | |
|---|---|---|
| GB | 2 273 131 | 6/1994 |
| GB | 2 288 578 | 10/1995 |
| WO | 2006 136748 | 12/2006 |

OTHER PUBLICATIONS

International Search Report issued Jan. 13, 2010 in PCT/FR09/00867 filed Jul. 15, 2009.

* cited by examiner

*Primary Examiner* — Edward Look
*Assistant Examiner* — Juan G Flores
(74) *Attorney, Agent, or Firm* — Oblon, Spivak, McClelland, Maier & Neustadt, L.L.P.

(57) ABSTRACT

An inner wall for a nacelle of a turbomachine, the inner wall including an outer annular fan casing for surrounding the fan blades and including at its upstream end a flange for fastening to a ring in axial alignment therewith, and a soundproofing inner annular structure for extending upstream from the fan blades, the fan casing extending substantially as far as an upstream end of the soundproofing structure such that the upstream flange of the fan casing is situated in a vicinity of the upstream end of the soundproofing structure.

19 Claims, 2 Drawing Sheets

INNER WALL FOR A TURBOMACHINE NACELLE

BACKGROUND OF THE INVENTION

1. Field of the Invention

The present invention relates to an inner wall of a nacelle of a turbomachine such as an airplane turboprop or turbojet.

2. Description of the Related Art

In general, any nacelle inner wall comprises an outer annular fan casing that surrounds the fan blades of the turbomachine, and that is suitable for having fastened therein an annular layer of abradable material surrounding the fan blades. At its downstream end, the fan casing has an annular flange for fastening to an intermediate casing of the turbomachine, and at its upstream end, it has an annular flange for fastening to the downstream end of a ring having its upstream end connected to a transverse annular partition for connecting together the inner and outer walls of the nacelle. In particular, the transverse partition may serve to stiffen the nacelle and also to provide a flame-arrestor function.

A soundproofing inner annular structure is arranged upstream from the fan blades to reduce the propagation of sound waves generated by the blades while in operation. The soundproofing structure is situated upstream from the abradable layer of the fan casing and it extends axially therefrom.

In the prior art, in order to install a one-piece soundproofing structure, the structure is fastened in the vicinity of its downstream end to the above-mentioned ring, and at its upstream end to the air intake lip of the nacelle.

Proposals have already been made to form the annular structure by assembling together a plurality of structural acoustic panels. Nevertheless, the connecting zones between the panels constitute zones in which there is a sudden change of acoustic impedance, thereby significantly degrading the soundproofing performance of the structure. The soundproofing structure is thus preferably made as a single substantially cylindrical panel that extends axially from the abradable layer of the fan casing to the air intake lip of the nacelle.

Nevertheless, that technology presents several drawbacks. For maintenance purposes, it is necessary to remove the cylindrical panel in order to remove the air intake lip, and that takes a relatively long time. Furthermore, the panel is structural in order to transmit forces between the air intake lip and the intermediate casing, and as a result it is relatively heavy. It is also expensive and complex to make. Finally, the flanges connecting the fan casing to the ring are situated at a short axial distance from the fan blades and they may be exposed to violent impacts and to high levels of mechanical stress in the event of a fan blade being lost.

BRIEF SUMMARY OF THE INVENTION

A particular object of the invention is to provide a solution that is simple, effective, and inexpensive to at least some of those drawbacks.

To this end, the invention provides an inner wall for a nacelle of a turbomachine, the inner wall comprising an outer annular fan casing for surrounding the fan blades and including at its upstream end a flange for fastening to a ring in coaxial alignment therewith, and a soundproofing inner annular structure for extending upstream from the fan blades, the inner wall being characterized in that the fan casing extends substantially as far as the upstream end of the soundproofing structure and in that the upstream flange of the fan casing is situated in the vicinity of the upstream end of said soundproofing structure.

According to the invention, the flange connecting the inner casing to the ring is offset to the upstream end of the soundproofing structure. The axial distance of the flange from the fan blades is thus relatively great, thereby limiting the risk of the flange being broken in the event of a fan blade being lost. Since this flange is not exposed to impacts or stresses that are excessive in the event of a blade being lost, it may have dimensions and weight that are smaller than those in the prior art. Furthermore, the means for fastening the flange to the ring may be lightened, simplified, and fewer in number around a circumference. This is made possible by the axial lengthening of the fan casing, which now extends from the intermediate casing as far as the air intake lip. This casing thus serves to stiffen the inner wall of the nacelle and it suffices on its own to transmit forces between the air intake lip and the intermediate casing. It is then possible to use a soundproofing structure that is not structural, and thus that is less expensive and less complex to make. It is also possible to lighten or indeed to omit the transverse partition of the prior art, because of the additional stiffness provided by the fan casing. The fan casing is preferably a single piece and made of a strong lightweight material such as a composite material.

The soundproofing structure may be fastened to the fan casing, e.g. by adhesive, welding, brazing, riveting, or screw fastening. It may optionally be releasably fastened to the fan casing in order to make it easier to replace it in the event of damage.

At its upstream end, the ring is preferably fastened to the air intake lip of the nacelle, e.g. by riveting. The present invention makes it easier to dismantle the air intake lip, since it is no longer necessary to remove the soundproofing structure while performing this operation.

The flange of the fan casing is fastened to a downstream flange of the ring, these flanges preferably extending substantially radially or axially relative to the longitudinal axis of the turbomachine.

When these flanges are radial, their junction plane may be substantially in alignment with the upstream end of the soundproofing structure. In a variant, this junction plane is situated at a distance from the upstream end of the soundproofing structure, upstream or downstream from said end.

The soundproofing structure extends axially from the upstream end of the fan casing over only a fraction of the axial dimension of the casing.

The soundproofing structure may be formed by a one-piece or sectorized acoustic annular panel.

The present invention also provides a turbomachine, such as an airplane turboprop or turbojet, including a nacelle having its inner wall of the above-specified type.

BRIEF DESCRIPTION OF THE SEVERAL VIEWS OF THE DRAWINGS

The invention can be better understood and other details, characteristics and advantages of the present invention appear more clearly on reading the following description made by way of nonlimiting example and with reference to the accompanying drawings, in which.

DETAILED DESCRIPTION OF THE INVENTION

Figure 1:
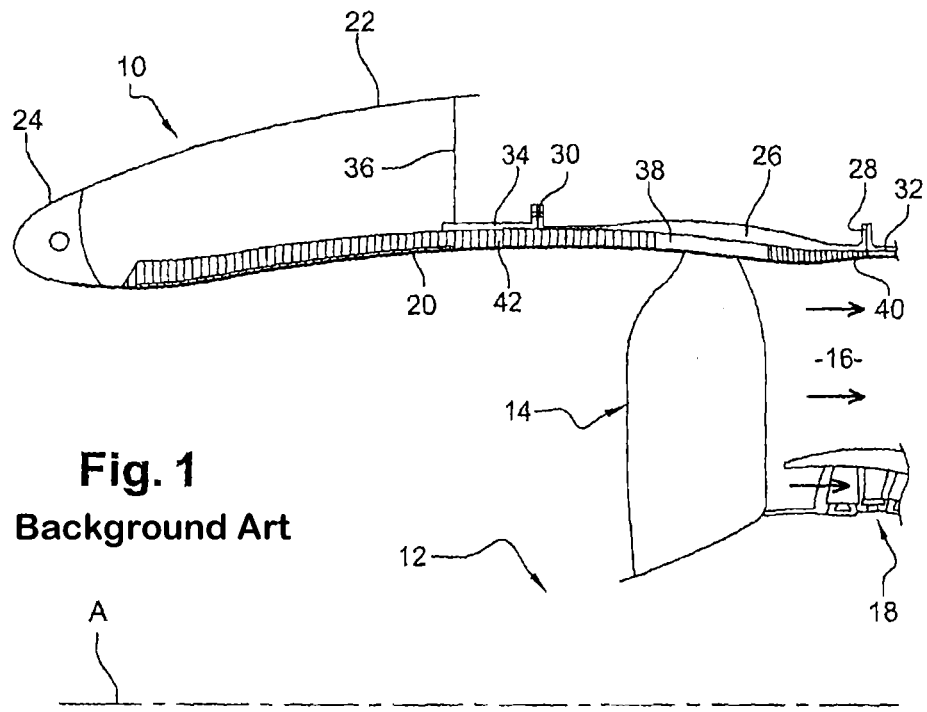
FIG. 1 is a fragmentary diagrammatic half-view in axial section of the air intake and the fan of a turbomachine of the prior art for installing a one-piece acoustic structure.

Reference is made initially to FIG. 1, which is a fragmentary diagrammatic half-view in axial section of an airplane engine including a nacelle 10 surrounding a turbojet 12 that comprises, at its upstream end, a fan 14 rotating inside the nacelle 10 and generating a secondary stream that flows in an annular duct 16 formed between the nacelle and the turbojet and that delivers a portion of the thrust produced by the engine.

The turbojet 12 also comprises, downstream from the fan 14, a compressor 18 through which there passes a fraction of the air that engages in the nacelle 10 and that is referred to as the primary stream.

The nacelle 10 comprises two annular walls 20, 22 that are substantially cylindrical, extending one inside the other, and that are connected together at their upstream ends by an annular air intake lip 24 having a section that is rounded or curved in profile, being convex in an upstream direction.

The inner wall 20 of the nacelle comprises a substantially cylindrical outer fan casing 26 surrounding the fan 14 and including annular fastener flanges 28, 30 at its longitudinal ends. The downstream flange 28 of the fan casing 26 is fastened by nut-and-bolt type means to an upstream annular flange of an intermediate casing 32 surrounding the compressor 18 of the turbomachine, and the upstream flange 30 of the fan casing 26 is fastened by nut-and-bolt type means to a downstream annular flange of a ring 34 having an axial dimension that is smaller than the axial dimension of the fan casing. The upstream end of this ring 34 is connected to the inner periphery of a reinforcing and force-transmitting transverse annular partition 36 having its outer periphery connected to the outer wall 22 of the nacelle.

An annular layer 38 of abradable material is fastened to the inner cylindrical surface of the fan casing 26 and surrounds the fan blades. This layer extends axially over an intermediate or middle portion of the casing 26. The axial dimension of this layer 38 is substantially equal to the maximum axial dimension of the fan blades 14. Soundproofing panels 40, 42 are also fastened to the fan casing 26 and to the ring 34, upstream and downstream from the abradable layer 38.

Downstream soundproofing panels 40 are fastened to the inner cylindrical surface of the fan casing 26 via a downstream end portion thereof. They are located downstream from the abradable layer 38, axially extending it.

A one-piece and cylindrical upstream soundproofing panel 42 is fastened at its upstream end to the air intake lip 24 and in the vicinity of its downstream end to the inner cylindrical surface of the ring 34. This panel 42 is structural and it connects the lip 24 rigidly to the ring 34. The downstream end portion of this panel is engaged in the upstream end of the fan casing 26 and it extends its abradable layer 38 axially.

In this configuration, the fan casing 26 has an axial dimension that is less than the axial dimension of the upstream panel 42 and, for example, it is equal to approximately two or three times the axial dimension of the fan blades. That technology presents numerous drawbacks as described above.

The invention enables these problems to be solved, at least in part, by lengthening of the fan casing axially upstream, and thus offsetting the flange connecting said fan casing to the ring in an upstream direction.

Figure 2:
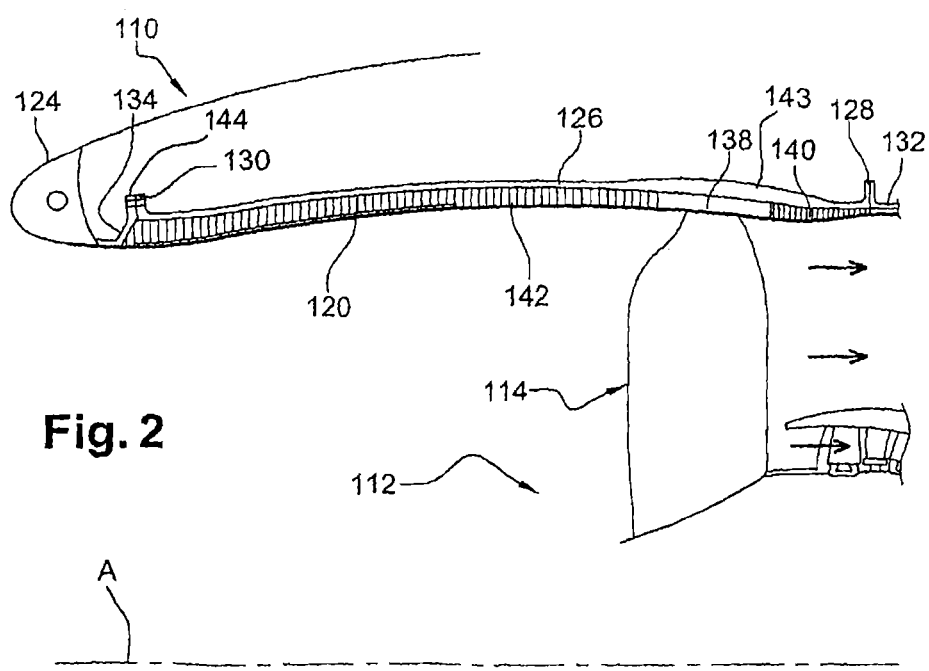
FIG. 2 is a fragmentary diagrammatic view in axial section of the air intake and of the fan of a turbomachine of the invention.

In the embodiment shown in FIG. 2, the fan casing 126 extends substantially as far as the upstream end of the upstream panel 142, and thus presents an axial dimension that is greater than the axial dimension of said panel. By way of example, this axial dimension is equal to five or six times the axial dimension of the fan blades 114, and is thus about twice as long as in the prior art.

The fan casing 126 is preferably formed as a single piece, and it could be made of a composite material. By way of example, it is of the type described in application FR 07/53449. The casing 126 preferably presents extra thickness 143 locally surrounding the fan blades 114 so as to reinforce the casing in this zone.

As in the prior art, the downstream end of the casing 126 includes a flange 128 for fastening to the intermediate casing 132. At its upstream end, it also includes an annular flange 130 for fastening to a downstream annular flange 144 of a ring 134 having its upstream end fastened, e.g. by means of rivets, to the inner periphery of the air intake lip 124.

The fan casing 126 thus serves to transmit forces from the air intake lip 124 to the intermediate casing 132.

The transverse partition 36 of the prior art is no longer necessary and may be omitted.

The upstream soundproofing panel 142 differs from that of the prior art in that it is non-structural and therefore lighter in weight. There is no longer any need to fasten it to the ring. It is fastened by welding, brazing, adhesive, riveting, screw fastening, etc. to the inside surface of the fan casing 126. The panel 142 may be formed as a single piece or it may be sectorized.

The downstream panels 140 and the abradable layer 138 are substantially identical to those of the prior art. In the example described, the ring 134 includes an upstream end portion that is substantially cylindrical and fastened to the air intake lip 124, and a downstream end portion that is substantially frustoconical, flaring downstream, and that includes at its downstream end, the flange 144 for fastening to the fan casing 126. The upstream end of the panel 142 is engaged in the frustoconical portion of the ring 134 and is complementary in shape to said portion. The inside cylindrical surface of the panel 142 is in alignment with the inside cylindrical surface defined by the upstream cylindrical portion of the ring 134. The flanges 130, 144 of the fan casing 126 and the ring 134 extend substantially radially relative to the longitudinal axis A of the engine.

FIGS. 3 to 6 show other variant embodiments of means for fastening the upstream end of the fan casing to the ring that is connected to the air intake lip.

Figure 3:
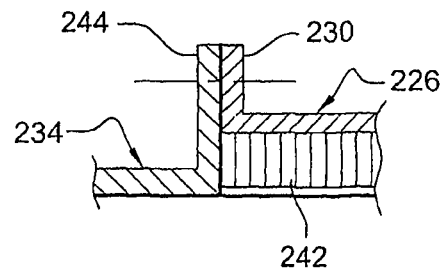
FIG. 3 is a fragmentary diagrammatic view in axial section of the means for fastening a fan casing to a ring of the inside wall of a nacelle of the invention.

In FIG. 3, the ring 234 is cylindrical, and at its upstream end it has a flange 244 for fastening to the flange 230 of the fan casing 226. The junction plane between the flanges is in alignment with the upstream end of the soundproofing panel 242, and the inside surface of this panel is axially in alignment with the inside surface of the ring.

Figure 4:
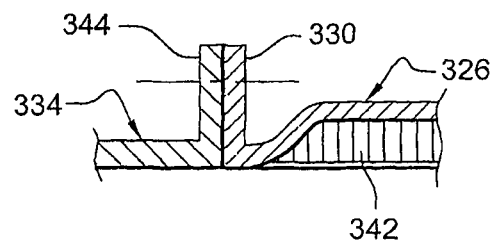
FIGS. 4 to 6 are figures corresponding to FIG. 3 and they show variant embodiments of the means for fastening the casing to the ring.

In the variant of FIG. 4, the ring is substantially identical to the ring of FIG. 3. The fan casing 326 comprises an upstream end portion that is substantially frustoconical, converging upstream and towards the axis of the turbomachine, and carrying at its upstream end, the flange 330 for fastening to the flange 344 of the ring 334. At its upstream end, the panel 342 presents a shape that is complementary to the shape of the casing, and its inside cylindrical surface is in alignment with the inside periphery of the upstream end portion of the fan casing 326.

Figure 5:
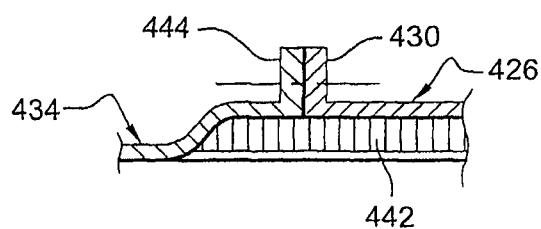

The variant shown in FIG. 5 differs from the fastener means of FIG. 2 in that the junction plane of the flange 430 of the fan casing 426 and the flange 444 of the ring 434 is axially further downstream from the upstream end of the soundproofing panel 442.

Figure 6:
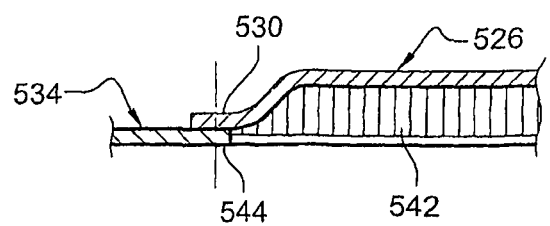

In the variant embodiment shown in FIG. 6, the flanges 530, 544 of the fastening between the fan casing 526 and the ring 534 extend substantially axially and not radially relative to the longitudinal axis of the turbomachine. The ring 534 is substantially cylindrical in shape and it is covered at its downstream end by the upstream axial flange 530 of the fan casing 526. The inside cylindrical surface of the panel 542 is in alignment with the inside surface of the ring 534.

The invention claimed is:

1. An inner wall for a nacelle of a turbomachine, the inner wall comprising:
    an outer annular fan casing for surrounding fan blades and including an upstream flange at an upstream end of the fan casing for fastening to a ring in coaxial alignment therewith; and
    a soundproofing inner annular structure extending upstream from the fan blades,
    wherein the fan casing extends substantially as far as an upstream end of the soundproofing structure,
    wherein the upstream flange of the fan casing is situated in a vicinity of the upstream end of the soundproofing structure,
    wherein an upstream end of the ring is fastened to an air intake lip of the nacelle, and
    wherein an annular layer of abradable material is fastened to an inner cylindrical surface of the fan casing and surrounds the fan blades.

2. An inner wall according to claim 1, wherein the soundproofing structure is fastened to the fan casing by adhesive, welding, brazing, riveting, or screw fastening.

3. An inner wall according to claim 1, wherein the upstream end of the ring is riveted to the air intake lip of the nacelle.

4. An inner wall according to claim 1, wherein the upstream flange of the fan casing is fastened to a flange of the ring, the flanges extending substantially radially or axially relative to the longitudinal axis of the turbomachine.

5. An inner wall according to claim 4, wherein a junction plane of the flanges is substantially in radial alignment with the upstream end of the soundproofing structure.

6. An inner wall according to claim 4, wherein a junction plane of the flanges is situated at a distance from the upstream end of the soundproofing structure, upstream or downstream from the end.

7. An inner wall according to claim 1, wherein the soundproofing structure extends axially from the upstream end of the fan casing over a fraction only of an axial dimension of the casing.

8. An inner wall according to claim 1, wherein the soundproofing structure is formed by a one-piece or sectorized acoustic annular panel.

9. An inner wall according to claim 1, wherein the fan casing is made of composite material.

10. A turbomachine, an airplane turboprop, or turbojet, comprising a nacelle including an inside wall according to claim 1.

11. An inner wall according to claim 1, wherein, upstream of the fan blades, the soundproofing structure defines an upstream panel which has, parallel to a longitudinal axis of the turbomachine, an axial dimension that is equal to five to six times an axial dimension of the fan blades.

12. An inner wall according to claim 1, wherein, between the fan blades and the upstream flange of the fan casing in an axial direction parallel to a longitudinal axis of the turbomachine, the inner wall is free of a connection to any transverse annular partition of the nacelle for connecting to an outer wall of the nacelle.

13. An inner wall according to claim 1, wherein the fan casing includes a downstream flange at a downstream end of the fan casing for fastening to an intermediate casing of the turbomachine.

14. An inner wall according to claim 1, wherein the fan casing extends mostly upstream the annular layer of abradable material.

15. A nacelle according to claim 1, wherein an upstream end of the ring is substantially cylindrical and fastened to the air intake lip of the nacelle, and a downstream end portion of the ring is substantially frustoconical, flaring downstream, and including at a downstream end thereof, a flange which is fastened to the upstream flange of the fan casing, and
    wherein an upstream end of the soundproofing inner annular structure is engaged in the frustoconical portion of the ring.

16. A nacelle of a turbomachine, the nacelle comprising an inner wall and an outer wall, the outer wall extending outside the annular inner wall, the inner wall comprising:
    an outer annular fan casing made axially of a one-piece structure for surrounding the fan blades and including an upstream flange at an upstream end of the fan casing for fastening to a ring in coaxial alignment therewith; and
    a soundproofing inner annular structure extending upstream from the fan blades and fastened to a part of the outer annular fan casing extending upstream from the fan blades,
    wherein the fan casing extends substantially as far as an upstream end of the soundproofing structure,
    wherein the upstream flange of the fan casing is situated in a vicinity of the upstream end of the soundproofing structure,
    wherein an annular layer of abradable material is fastened to the fan casing and surrounds the fan blades,
    wherein the fan casing and the soundproofing inner annular structure extends mostly upstream the annular layer of abradable material, and
    wherein an upstream end of the ring is fastened to an air intake lip of the nacelle which connects together, at respective upstream ends, the inner wall and outer wall of the nacelle.

17. A nacelle of a turbomachine having a longitudinal axis and comprising:
    an annular outer wall;
    an annular inner wall extending radially to the longitudinal axis inside the annular outer wall; and
    an annular air intake lip connecting together at respective upstream ends the inner and outer walls, the air intake lip having a curved-profile section that is convex in an upstream direction, the inner wall comprising
        an outer annular fan casing for surrounding fan blades and including an upstream flange at an upstream end of the fan casing, the upstream flange being fastened to a ring in coaxial alignment therewith; and
        a soundproofing inner annular structure extending upstream from the fan blades,
    wherein the fan casing extends substantially as far as an upstream end of the soundproofing structure,
    wherein the upstream flange of the fan casing is situated in a vicinity of the upstream end of the soundproofing structure,
    wherein an upstream end of the ring is fastened to the air intake lip, and
    wherein the ring is free of fixation to the outer wall.

18. A nacelle according to claim 17, wherein an annular layer of abradable material is fastened to an inner cylindrical surface of the fan casing and surrounds the fan blades.

19. A nacelle according to claim 18, wherein the fan casing extends mostly upstream the annular layer of abradable material.

\* \* \* \* \*